United States Patent
Lamoureux et al.

(10) Patent No.: US 7,556,130 B2
(45) Date of Patent: Jul. 7, 2009

(54) TRACK SYSTEM, AND VEHICLE INCLUDING THE SAME

(75) Inventors: Martin Lamoureux, Boucherville (CA); Samuel Arsenault, Longueuil (CA); Stéphane Lépine, Montreal (CA)

(73) Assignee: Elka Suspension Inc., Boucherville, Quebec (CA)

( * ) Notice: Subject to any disclaimer, the term of this patent is extended or adjusted under 35 U.S.C. 154(b) by 0 days.

(21) Appl. No.: 11/355,889

(22) Filed: Feb. 17, 2006

(65) Prior Publication Data

US 2006/0180419 A1 Aug. 17, 2006

Related U.S. Application Data

(60) Provisional application No. 60/653,483, filed on Feb. 17, 2005.

(51) Int. Cl.
*F16F 9/00* (2006.01)

(52) U.S. Cl. .................. 188/318; 188/285; 188/322.14

(58) Field of Classification Search ................ 188/285, 188/318, 312, 322.13, 322.14, 322.21
See application file for complete search history.

(56) References Cited

U.S. PATENT DOCUMENTS

| 1,628,811 | A | | 5/1927 | Shultz et al. |
|---|---|---|---|---|
| 1,957,997 | A | | 5/1934 | Fieldman |
| 2,009,678 | A | | 7/1935 | Pennington |
| 3,103,993 | A | * | 9/1963 | Gies ............................ 188/274 |
| 4,773,514 | A | | 9/1988 | Gustafsson |
| 4,928,799 | A | * | 5/1990 | Zschiesche .................. 188/314 |
| 5,400,880 | A | * | 3/1995 | Ryan ........................... 188/314 |
| 5,409,248 | A | * | 4/1995 | Williams ..................... 280/284 |
| 5,516,133 | A | | 5/1996 | Motrenec et al. |
| 5,634,653 | A | * | 6/1997 | Browning ................... 280/276 |
| 6,401,884 | B2 | | 6/2002 | Norman et al. |
| 2002/0084158 | A1 | * | 7/2002 | Matsuhashi ................. 188/297 |

* cited by examiner

*Primary Examiner*—Xuan Lan Nguyen
(74) *Attorney, Agent, or Firm*—Robic

(57) ABSTRACT

A track system for providing complementary shock absorbing capability to a primary shock absorbing assembly having a hydraulic path containing fluid. The track system includes a chamber, a damping assembly and an adjusting assembly. The chamber has opposite first and second ends, the first end of the chamber being provided with a port operatively connectable to the hydraulic path of the primary shock absorbing assembly, the port being configured for allowing fluid from the hydraulic path of the primary shock absorbing assembly to enter and exit the chamber of the track system through the port thereof. The damping assembly is configured for damping a flow of fluid entering the chamber via the port thereof. The adjusting assembly is configured for adjusting a damping mode of the damping assembly.

14 Claims, 3 Drawing Sheets

TRACK SYSTEM, AND VEHICLE INCLUDING THE SAME

The present application claims priority of U.S. provisional patent application No. 60/653,483, filed Feb. 17, 2005, the content of which is incorporated herein by reference.

FIELD OF THE INVENTION

The present invention relates to a track system. More particularly, in its preferred intended use, the present invention relates to a track system such as the ones used on motorbikes, all-terrain vehicles (ATV) and the like, and also relates to a vehicle including such a track system.

BACKGROUND OF THE INVENTION

Conventional shock absorbers which comprise a hydraulic circuit or path containing fluid (typically oil) for carrying out a damping of shocks that a vehicle may be subjected to when travelling over a given terrain, are very well known in the art. Essentially, the damping of shocks is done via a compression of the fluid contained in the hydraulic path of the shock absorber.

Also known in the art are conventional shock absorbers that rely on a compressing of an elastic objet (e.g. spring) for carrying out a corresponding damping of shocks.

Also known in the art are conventional shock absorbers that rely on a combined effect of both a compression of fluid and a compression of a spring.

It is also known in the art that in certain conventional shock absorbers, when the shock compresses, the movement of a corresponding shaft will displace a certain amount of hydraulic fluid (e.g. oil). This displaced oil will pass through adjustments. The range of these adjustments can vary the opening of the flow channels for the oil to pass therethrough. If the passage is smaller or reduced, then the oil will encounter more resistance to flow therethrough. If the passage is larger or increased, then the oil will encounter less resistance to flow therethrough. This resistance will permit the shock to absorb a certain amount of energy, depending on the particular static and/or dynamic loads to which the vehicle, including such a conventional shock absorber, is subjected to.

Also known in the art are the following US patents which describe various devices (dampers, stabilizers, shock absorbers, etc.) for use with motorbikes, ATVs and the like: U.S. Pat. Nos. 1,628,811; 1,957,997; 2,009,678; 4,773,514; 5,516,133; and 6,401,884 B2.

It is also known in the art that in a conventional high-speed and low-speed shock absorber, movement of the shock is typically controlled by two independent circuits. These circuits act on the same flow of oil, and the work is distributed according to the oil flow velocity. However, and disadvantageously, the system always reacts to impact velocity in the same way, and any adjustments affect only a part of the damping cycle.

Furthermore, it is also known that this type of conventional shock absorber and others are not intended to readily and/or easily be adjusted to compensate for a rider's weight, a vehicle model, a riding style and/or unpredictable fluctuations that may arise in a given terrain. Indeed, this type of conventional shock absorber and others are not readily and/or easily adaptable to a variety of racing conditions, which adversely affects rider comfort, resulting namely in increased fatigue and arm-pump.

Hence, in light of the aforementioned, there is a need for an improved device which would be able to overcome and/or remedy some of the aforementioned prior art problems.

SUMMARY OF THE INVENTION

An object of the present invention is to provide a track system which, by virtue of its design and components, satisfies some of the above-mentioned needs and which is thus an improvement over other related devices and/or methods known in the prior art.

In accordance with the present invention, the above object is achieved, as will be easily understood from the present description, with a track system for providing complementary shock absorbing capability to a primary shock absorbing assembly having a hydraulic path containing fluid, the track system comprising:

a chamber having opposite first and second ends, the first end of the chamber being provided with a port operatively connectable to the hydraulic path of the primary shock absorbing assembly, said port being configured for allowing fluid from the hydraulic path of the primary shock absorbing assembly to enter and exit the chamber of the track system through the port thereof;

a damping assembly for damping a flow of fluid entering the chamber via the port thereof;

an adjusting assembly for adjusting a damping mode of the damping assembly.

According to another aspect of the invention, there is also provided a vehicle provided with the above-mentioned track system.

Preferably, the vehicle is a motorbike, ATV and/or the like.

According to yet another aspect of the invention, there is also provided a method of operating a track system such as the one briefly described herein and such as the one exemplified in the accompanying drawings, and/or a method of operating a vehicle including the same.

According to yet another aspect of the invention, there is also provided a method of assembling the above-mentioned track system.

According to yet another aspect of the invention, there is also provided a kit comprising components for assembling the above-mentioned track system.

The objects, advantages, and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
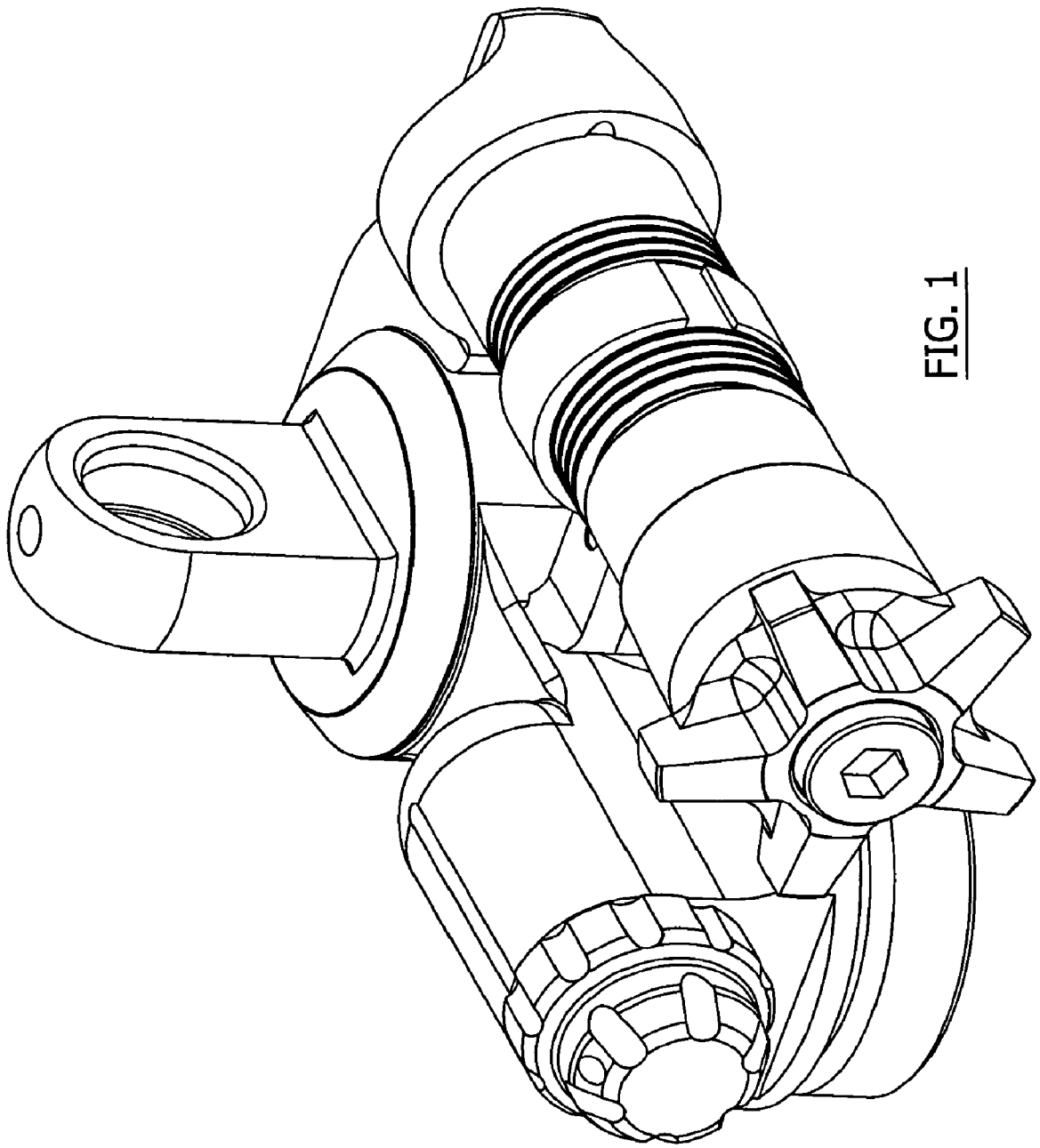
FIG. 1 is a perspective view of a track system according to a preferred embodiment of the present invention.

In the following description, the same numerical references refer to similar elements. The embodiments shown in the figures are preferred, for exemplification purposes only.

Moreover, although the present invention was primarily designed for high-performance suspension systems for racing and recreational motorsport applications, and, in its intended preferred use, for use with a motorbike, ATV and/or the like, it may be used with other objects and/or other types of vehicles and/or corresponding suspension systems, as apparent to a person skilled in the art. For this reason, expressions such as "motorbike", "bike", "ATV", "vehicle", etc., used herein should not be taken so as to limit the scope of the present invention and include all other kinds of objects and/or applications with which the present invention could be used and may be useful.

Moreover, in the context of the present invention, the expressions "track system", "stabilizer", "damper", "absorber", "device", as well as any other equivalent expressions, derivatives and/or compound words thereof, may be used interchangeably. The same applies for any other mutually equivalent expressions, such as "bike" and "vehicle" for example, as well as "oil" and "fluid", as well as "adjusting" and "varying", as also apparent to a person skilled in the art.

In addition, although the preferred embodiments of the present invention as illustrated in the accompanying drawings comprise various components, and although the preferred embodiments of the track system and corresponding parts as shown consist of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations thereinbetween, as well as other suitable geometrical configurations may be used for the track system and corresponding parts according to the present invention, as will be briefly explained herein and as can be easily inferred herefrom, without departing from the scope of the present invention, as can also be easily understood by a person skilled in the art.

List of numerical references and corresponding preferred components illustrated:
1. track system
3. chamber
5. damping assembly
7. adjusting assembly
9. first end (of chamber 3)
11. second end (of chamber 3)
13. port (of first end 9 of chamber 3)
15. hydraulic path
17. primary shock assembly
19. piston (of damping assembly 5)
21. biasing assembly (of damping assembly 5)
23. face (of piston 19)
25. fluid
27. peripheral seal (of piston 19)
29. inner wall (of chamber 3)
31. wear band
33. spring (of biasing assembly 21)
35. first extremity (of spring 33)
37. second extremity (of spring 33)
39. adjustment screw
41. portion (of adjustment screw 39)
43. other portion (of adjustment screw 39)
45. seal head
47. first extremity (of adjustment screw 39)
49. second extremity (of adjustment screw 39)
51. knob
53. collar
55. outer portion (of chamber 3)
57. inner surface (of collar 53)
59. longitudinal grooves (of collar 53)
61. detent mechanism
63. longitudinal stopper
65. stopper or spacer
67. orifice (of spacer 65)
69. tip (of longitudinal stopper 63)
71. valving assembly
75. valving
77. shim
79. first portion (of chamber 3)
81. fastener
83. head (of fastener 81)
85. peripheral seal (of valving 75)
87. valving channel
89. cavity (of piston 19)
91. first end surface (of spacer 65)
93. second end surface (of spacer 65)
95. recess (of spacer 65)
97. inner bore (of spacer 65)
99. protrusion (of piston 19)
101. additional spacer
103. first end surface (of additional spacer 101)
105. second end surface (of additional spacer 101)
107. recess (of additional spacer 101)
109. bearing
111. primary shock absorber Broadly described, the track system 1 according to the present invention, as exemplified in the accompanying drawings, is track system 1 for providing complementary shock absorbing capability to a main or primary shock absorbing assembly having a hydraulic path which contains fluid. For example, this primary shock absorbing assembly may be a conventional high-speed/low-speed shock absorber. Preferably also, the track system 1 is adapted to be mounted onto a vehicle, such as motorbikes, ATVs and the like, and/or any other suitable vehicle requiring shock absorbing and/or stabilizing capabilities, as will be easily understood from the present description by a person skilled in the art.

Figure 2A:
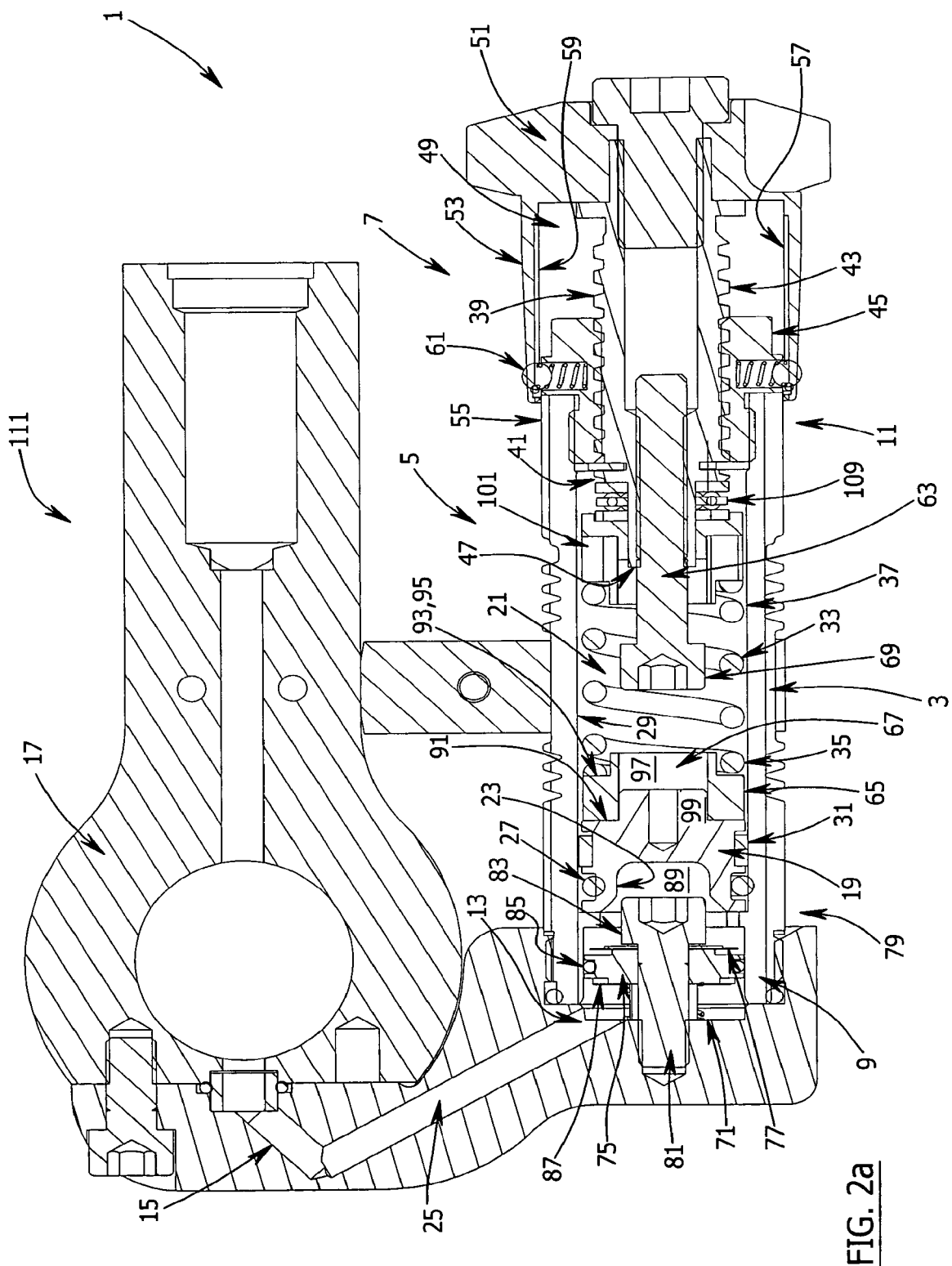
FIG. 2a is a sectional view of the track system according to another shown in FIG. 1, the track system being shown in a given operating configuration.
Figure 2B:
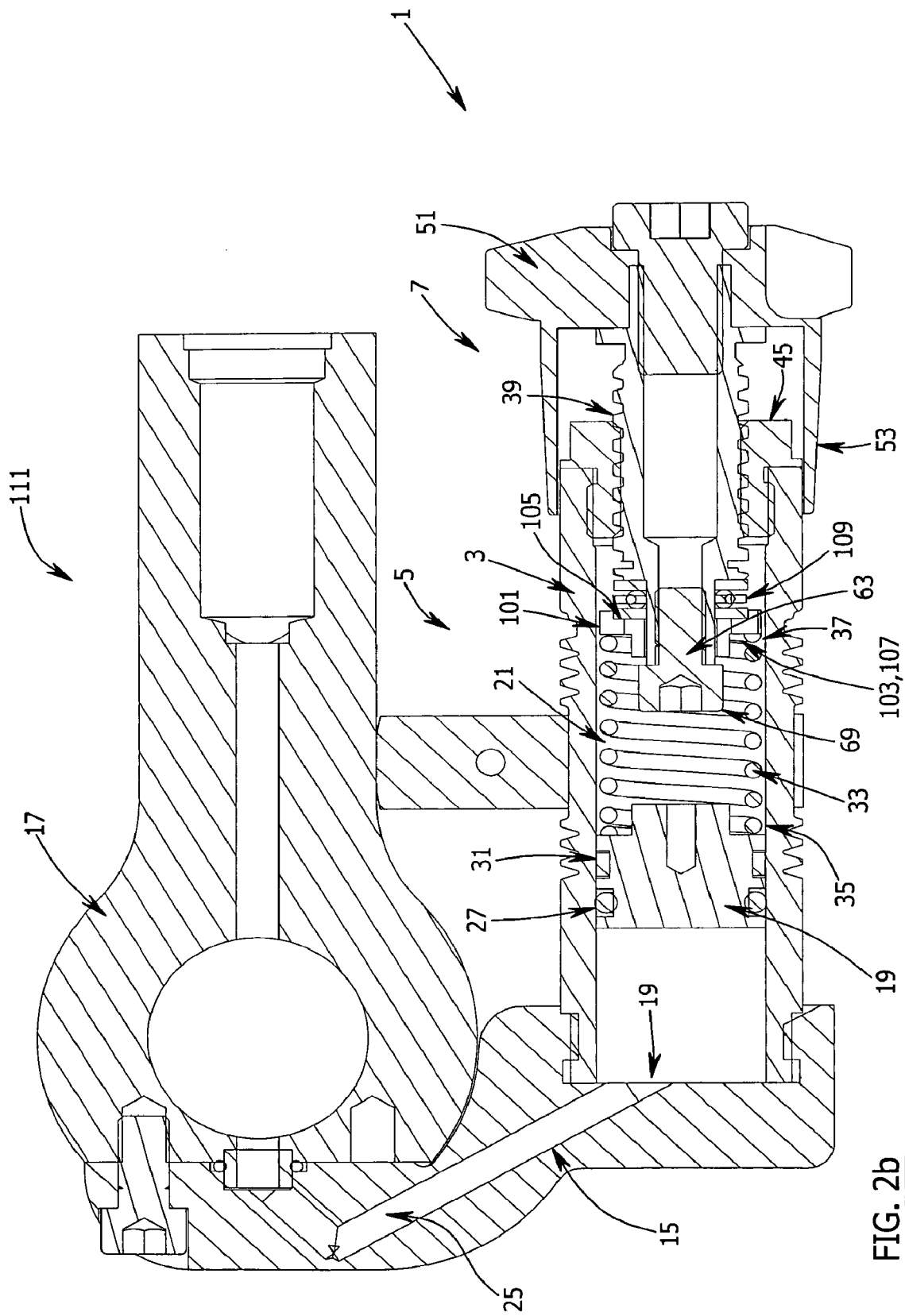
FIG. 2b is another sectional view of a track system according to another preferred embodiment of the present invention, the track system being also shown in a given operating configuration.

As better shown in FIGS. 2a and 2b, the track system 1 preferably comprises a chamber 3, a damping assembly 5 and an adjusting assembly 7. The chamber 3 preferably has opposite first and second ends 9, 11, the first end 9 of the chamber 3 being provided with a port 13 operatively connectable to the hydraulic path 15 of the primary shock absorbing assembly 17, said port 13 being configured for allowing fluid from the hydraulic path 15 of the primary shock absorbing assembly 17 to enter and exit the chamber 3 of the track system 1 through the port 13 thereof. The damping assembly 5 is configured for damping a flow of fluid entering the chamber 3 via the port 13 thereof. The adjusting assembly 7 is configured for adjusting a damping mode of the damping assembly 5.

Preferably also, the track system 1 is devised to be mountable and demountable, that is, the different components thereof can be preferably assembled or disassembled (for easier repairs, maintenance, adjustments, etc.) and the chamber 3 thereof, when assembled and operatively connected to the hydraulic path 15 of the primary shock absorbing assembly 17 of a vehicle, is preferably properly sealed (negligible or no fluid leakage, as apparent to a person skilled in the art) and closed-end, so that fluid entering and exiting the chamber 3 is solely done via the port 13 of said chamber 3 (most or all of the fluid interchanged between the primary shock absorbing assembly 17 and the track system 1 is preferably done through the port 13 thereof, as also apparent to a person skilled in the art).

According to a preferred embodiment of the present invention, the damping assembly 5 comprises a piston 19 and a biasing assembly 21. The piston 19 is preferably positioned within the chamber 3, adjacent to the port 13 thereof, and is movable along the chamber 3 and has a face 23 for abutting against fluid 25 from the hydraulic path 15 of the primary shock absorbing assembly 17, when entering the chamber 3 of the track system 1 via the port 13 thereof, as can be easily understood from FIGS. 2a and 2b. The biasing assembly 21 is preferably configured for biasing the piston 19 towards the port 13 of the chamber 3 against the flow of fluid 25 entering the chamber 3, for carrying out a damping of the fluid 25.

As also shown, the piston 19 is preferably provided with a peripheral seal 27 cooperating with an inner wall 29 of the chamber 3 so as to prevent fluid from the hydraulic path 15 of the primary shock absorbing assembly 17, when entering the chamber 3 of the track system 1 via the port 13 thereof, from substantially flowing past the piston 19 and corresponding seal 27. Preferably also, the piston 19 is further provided with a peripheral wear band 31 positioned adjacent and downstream of the corresponding seal 27.

According to a preferred embodiment of the present invention, the biasing assembly 21 includes a spring 33 having opposite first and second extremities 35, 37 the first extremity 35 of the spring 33 being operatively connected against the piston 19 and the second extremity 37 of the spring 33 being operatively connected against the second end 11 of the chamber 3 for urging the piston 19 towards the port 13 of the chamber 3 via a biasing force of the spring 33, as can be easily understood when contrasting FIGS. 2a and 2b. Alternatively, the spring 33 may be replaced by an elastic, or a compressed air system or any other device accomplishing the same function as the spring in substantially the same way, as will be understood by persons skilled in the art.

Preferably also, the adjusting assembly 7 comprises an adjustment screw 39, said adjustment screw 39 having a portion 41 operatively in abutment with the second extremity 37 of the spring 33, the adjustment screw 39 being movable longitudinally within the chamber 3 for displacing the second extremity 37 of the spring 33 with respect to the first extremity 35 of the spring 33 for adjusting a biasing force of said spring 33.

As can be easily understood from FIGS. 2a and 2b, and preferably also, the adjustment screw 39 has a portion 43 being threadedly engaged with an inner component (e.g. seal head 45) of the casing and is moveable therealong, the adjustment screw 39 further having first and second extremities 47, 49, the second extremity 49 of the adjustment screw 39 being provided with a knob 51 preferably positioned outwardly from the casing, the knob 51 being configured such that a rotation thereof generates a displacement of the adjustment screw 39 longitudinally within the chamber 3.

As better shown in FIG. 2a, the knob 51 is preferably provided with a collar 53 mountable rotatably about an outer portion 55 of the chamber 3. Preferably also, the inner surface 57 of the collar 53 is provided with longitudinal grooves 59, that is, extending along the length of the collar 53, which cooperate with at least one underlying detent mechanism 61 for determining corresponding incremental changes in the rotation of the knob 51 which result in corresponding incremental changes in the displacement of the adjustment screw 39 and in turn result in incremental changes in the biasing force of the spring 33, by means of a variation in the effective length thereof, thereby enabling an incremental adjustment of the damping mode of the damping assembly 5 via a rotation of the knob 51. According to the preferred embodiment illustrated in FIG. 2a, the chamber 3 is provided with a seal head 45 mounted onto the second end 11 of the chamber 3, said seal head 45 serving also as a support for the adjustment screw 39, as aforementioned, and for the detent mechanisms 61, which preferably consist of corresponding spring-ball assemblies extending outwardly from the fixed seal head 45, and cooperating with the above-mentioned longitudinal grooves 59 of the collar 53 of the knob 51, as above-discussed and as can be easily understood by a person skilled in the art.

Preferably, and as also better shown in FIG. 2a, the first extremity 47 of the adjustment screw 39 comprises a longitudinal stopper 63 having an extremity configured to operatively abut against the piston 19 (or against an adjacent stopper 65, for example) for delimiting a range of compression of the spring 33 within the chamber 3 by the adjustment screw 39. The spacer 65 illustrated in FIG. 2a has a corresponding orifice 67 for receiving therein the tip 69 of the longitudinal stopper 63 which is intended to abut with the piston 19 so as to delimit the run of the adjustment screw 39, and thus the compression range, and resulting biasing force of the spring 33, for a given application of the track system 1 and/or for a corresponding desired end result of a user of said track system 1.

Preferably also, and as better shown in FIG. 2a, the damping assembly 5 comprises a valving assembly 71 for providing via the track system 1 base complementary damping capability to the primary shock absorbing assembly 17. According to this preferred embodiment of the invention, the valving assembly 71 comprises a valving 75 and at least one shim 77, the valving 75 and the at least one shim 77 being positioned within a first portion 79 of the chamber 3 between the port 13 and the piston 19 of the damping assembly 5, as shown, for providing a base resistance to fluid from the hydraulic path 15 of the primary shock absorbing assembly 17, when entering said first portion 79 of the chamber 3 of the track system, so as to provide the aforementioned base complementary damping capability to the primary shock absorbing assembly 17. Preferably also, the valving 75 and the at least one shim 77 are secured to the first end 9 of the chamber 3 by means of a fastener 81 having a head 83 in abutment with an outermost shim of the at least one shim 77.

Preferably also, the valving 75 is provided with a peripheral seal 85 cooperating with an inner wall 29 of the chamber 3 so that fluid from the hydraulic path 15 of the primary shock absorbing assembly 17, when entering the first portion 79 of the chamber 3 via the port 13 thereof, is passed through corresponding valving channels 87 of the valving 75 and about the at least one shim 77 before abutting against the piston 19 of the damping assembly 5. The valving 75 may be adjusted from the exterior as is known by persons skilled in the art.

Other ways of providing a base resistance to fluid entering the chamber can be used according to the present invention, as apparent to a person skilled in the art. Alternatively, the track system 1 could also operate without a valving assembly 71, as exemplified in FIG. 2b, and as explained in greater detail hereinbelow.

According to another preferred aspect of the present invention, as exemplified in FIG. 2a, the piston 19 of the damping assembly 5 comprises a cavity 89, the cavity 89 being shaped and sized for receiving therein, for example, a head 83 of the fastener 81 used for securing the valving 75 and the at least one shim 77 to the first end 9 of the chamber 3.

According to another preferred aspect of the present invention, as also exemplified in FIG. 2a, a spacer 65 is provided in the chamber 3, between the piston 19 of the damping assembly 5 and the first extremity 35 of the spring 33, so as to, if a certain application of the track system 1 requires it, be able to vary the effective length of the spring 33 and thus adjust the biasing force of said spring 33, during assembling of the track system 1, prior to installation onto the primary shock absorbing assembly 17, for example. Preferably also, the spacer 65 has opposite first and second end surfaces 91, 93, the first end surface 91 being operatively in abutment against the piston 19 of the damping assembly 5 and the second end surface 93 being provided with a recess 95 for receiving the first extremity 35 of the spring 33. Preferably, the spacer 65 has an inner bore 97 for receiving therein a corresponding protrusion 99 of the piston 19 of the damping assembly 5, as also shown in FIG. 2a.

As also shown in the preferred embodiment of FIG. 2a, an additional spacer 101 is preferably provided in the chamber 3, between a portion of the adjustment screw 39 and the second extremity 37 of the spring 33, so as to also be able to further vary the effective length of the spring 33 and thus adjust the biasing force of said spring 33. This additional spacer 101 preferably has opposite first and second end surfaces 103, 105, the first end surface 103 being provided with a recess 107 for receiving the second extremity 37 of the spring 33 and the second end surface 105 being operatively mounted about the first extremity 47 of the adjustment screw 39. Furthermore, and preferably, the use of spacers 65, 101 is also advantageous in that, when provided with suitable recesses 95, 107 and the like, they enable for a same given track system 1 to be used with different types of springs 33 (length, diameter, etc.), as apparent to a person skilled in the art.

It is worth mentioning that according to the present invention, spacers 65, 101 may be provided in different numbers and may cooperate differently with the other components of the track system 1, depending on the particular applications for which it may be intended, and the different parameters in cause (length of spring 33, diameter of spring 33, material of spring 33, desired biasing force, desired range of compression, etc.), as also apparent to a person skilled in the art.

Preferably also, at least one bearing 109 is operatively provided between the additional spacer 101 and the corresponding portion of the adjustment screw 39 (or other corresponding component operatively connected thereto), so as to reduce friction therebetween, as can be easily understood by a person skilled in the art. According to the present invention, other types of suitable bearings 109 placed properly between adjacent components may be used, as apparent to a person skilled in the art.

According to the preferred embodiment of the present invention, the piston 19 used for the damping assembly 5 is a floating piston, but it is to be understood that other suitable types of pistons, and cooperations with corresponding components of the track system 1 (e.g. chambers 3) may be used so as to enable a corresponding displacement of the piston 19 within the chamber 3, in the manner briefly explained herein, as can be easily understood by a person skilled in the art. For example, the piston 19 of the damping assembly 5 could be provided with corresponding guiding mechanisms, as also apparent to a person skilled in the art.

As aforementioned, the track system 1 according to the present invention, as exemplified in the accompanying drawings, is a track system 1 which is an hydraulic adjustment preferably parallel to the normal flow of oil in a main or primary shock absorber 111. The oil flow can go either in the conventional adjustments of the main shock absorber 111 or in the track system 1 according to the present invention. As can be easily understood by a person skilled in the art, in reference to the present description, the velocity and pressure of the oil in the main shock absorber 111 will determine when the track system 1 becomes effective. Furthermore, the track system 1 can be adjusted via its different components (spring 33, spacers 65, 101, valving assembly 71, adjustment screw 39 operated by corresponding knob 51, etc.) to work at different oil pressures and flows. As can now be better understood, and if need may be, the track system 1 can be selectively configured or adjusted so as to not be effective at all (no movement of the piston 19 of the damping assembly 5), so that the oil will go through the conventional adjustments of the primary shock absorbing assembly 17 and make it work like a normal shock absorber 111.

However, when the track system 1 is activated, the flow of oil will pass through the preferred valving assembly 71 of the system 1 and move the preloaded piston 19 (i.e piston 19 of the damping assembly 5). If the flow of fluid (oil) continues to enter the chamber 3 it will move the preloaded piston 19 until, if need may be, it stops against the stroke limiting adjustment (i.e longitudinal stopper 63). In such an event, the remaining flow of oil will pass through the conventional adjustments of the main or primary shock absorbing assembly 17. Once the pressure decreases therein, to a predetermined threshold, the oil that was accumulated in the chamber 3 will go back to the main shock absorber 111 through a preferred one-way valve operatively connected to the port 13 of chamber 3 of the track system 1. Preferably also, this valve only works when the flow of oil is coming out of said chamber 3.

As may now be better appreciated from the aforementioned, the track systems 1 and preferred components thereof according to the present invention provide several advantages over other related devices and/or methods known in the prior art.

Indeed, and for example, in regard to the chamber 3, it is preferably in the form of a cylinder. This chamber 3 holds most of the parts necessary to the functionality of the track system 1. The advantage of this outer chamber 3 is that it enables to place the track system 3 outside the main or primary shock absorber 111. This helps namely in not interfering with the normal operation of the shock until the track system 1 is activated or called upon. It is worth mentioning however that according to the present invention, a track system 1 could be fitted or integrated inside the regular shock absorber 111 if outside space would not be available.

In regard to the stroke limiting adjustment (i.e. longitudinal stoppers 63), this stroke limiter will preferably enable the system 1 to work for a certain amount selected. The advantage of this is that it enables a user of the track system 1 to decide how much one wants the system 1 to be active or effective. For example, one can adjust the stroke limiter for small movements and the track system 1 will effectively work on a given riding surface with small ripples. However, by adjusting the stroke limiter by a rotation of the knob 51 for a larger movement, then the track system 1 will work on a given surface with large whoops (oscillations).

In regard to the spring 33 and preloaded piston 19: by adjusting the preload on the spring 33 this will preferably control at which pressure the track system 1 will become operative. A stiff spring 33 with more preload will work only in extreme cases, as apparent to a person skilled in the art. A softer spring 33 with little preload will work in almost all conditions encountered, as also apparent to a person skilled in the art. Indeed, as is known in the art, under the same conditions, different vehicles will have different reactions, therefore, according to the track system 1 of the present invention, the stiffness of the spring 33 can be selectively changed according to various types of vehicles and different riding conditions.

In regard to the valving 75: this valving 75 will preferably control the amount of flow going into the track system 1 once it is active. A high flow valving 75 will permit a large amount of oil to pass through and reach the preloaded piston 19 in a short amount of time. A small flow valving 75 will allow the same amount of oil flow over a longer period of time. The valving 75 will help control the flow of oil. Together with the main piston 19 of the track system 1 (i.e. piston 19 of the damping assembly 5 or "preload piston" 19), it will preferably control the flow going into the chamber 3. It is worth mentioning though that other suitable means may be used for achieving the above-mentioned end results, as also apparent to a person skilled in the art.

It is worth mentioning also that, within the scope of the present invention, a system 1 was tested without a valving assembly 71 (see FIG. 2b). This system 1 can be used in a small number of types of vehicles because of its different characteristics. Since there is no corresponding valving 75 to control the flow going to the chamber 3, it will only be used where a very large amount of flow is required. It will work as the above-described track system 1 except that the oil will pass freely from the shock absorber 111 to the preloaded piston 19, as also apparent to a person skilled in the art.

As may now be better appreciated, and according to the present invention, a main goal of the track system 1 is to make a given shock absorber 111 adaptable to a variety of racing conditions and to provide greater rider comfort, thereby reducing fatigue and arm-pump. Thus, the track system 1 is intended to provided a "buffer" action that filters peak forces before, for example, the high-speed compression of a conventional device starts counteracting those forces.

The track system 1 according to the present invention is easy to adjust for any track. Indeed, its preferred twin-rate action provides a smooth ride over choppy terrain while still providing the required impact resistance. No other shock on the market can deliver both results with the simple on-the-fly adjustability of a single knob 51, as above-discussed.

Indeed, as may now also be better appreciated, the main principle behind the track system 1 is the addition of a chamber 3 "in parallel" with the standard compression circuit found in traditional shock absorbers 111. Adjusted by an external knob 51, this chamber 3 offers initial resistance that is independent of the principal damping circuit. By being preferably activated, due to its design, before the main hydraulic circuit, the initial resistance provides greater comfort and better control in many situations without any perceptible transition for the rider.

In the track system 1, the oil preferably flows from the main damping circuit into a "parallel" circuit (i.e above-described chamber 3). In peak force situations, as when casing a jump on landing or in braking bumps, the track system 1 according to the present invention absorbs a portion of the peak force before the main hydraulic system reads. This reduces the force considerably, enabling more efficient damping by the primary high-speed and low-speed compression system, for example. This double action advantageously diminishes the workload for the rider. For example, when riding at full speed over small bumps and choppy terrain, the smooth damping of the track system 1 will keep the wheels of the vehicle in contact with the ground and erases peak velocity forces to provide a more comfortable ride with less rider fatigue.

The track system 1 is revolutionary not only because of the adjustable range twin-rate circuit, but also because it is position-sensitive. This means that the portion controlled by the device can vary with the shock's position in its travel. Even when the shock of the main shock absorber 111 is deep into its travel, it responds smoothly, absorbing small bumps in infinite increments. Furthermore, the track system 1 acts like a buffer between the low and high speed compression stages to soften peak velocity impact forces.

As can also be easily understood from the present invention, the track system 1 and the various components thereof, are preferably made of a suitable material, such as steel and the like, providing suitable structural soundness, while enabling the system 1 to be produced/manufactured/assembled according to a suitable process, and in a cost-effective manner, while being structurally rigid enough to carry out its proper functions, and withstand adverse operating/loading conditions. Other suitable materials may be used according to the present invention, as apparent to a person skilled in the art.

According to the present invention, the track system 1 and corresponding parts may be shaped and sized so as to accommodate different types of vehicles. Thus, it could be easily understood that several components and features may be added or modified to the body and corresponding supporting members of the track system 1 and/or to the corresponding primary shock absorbing assembly 17, without departing from the scope of the present invention.

Indeed, and for example, the track system 1 and/or corresponding primary shock absorbing assembly 17 may comprise: high-quality triple-seal heads; a checkball that isolates the compression adjustment from the rebound adjustment; needle type adjusters for precise incremental adjustment; a hard-anodized piston; a threaded preload collar for easier adjustment; a high-quality seals, o-rings and wearbands to reduce friction and heating for longer shock life; a blow-off valve to prevent internal damage to the shock from peak forces; plastic-coated, stainless steel braided hosing for optimal flow attached with high-quality banjo bolts that prevent restriction; high-performance microcellular progressive bottom-out bumpers for a smoother feeling; spherical bearings at both ends to isolate the shock absorber from torsional force; an induction-hardened ⅝' shaft; crossovers specific to the vehicle and type of riding; a CNC-machined, aeronautical grade anodized billet aluminum parts; no special tools required for adjustments; CNC-machined billet aluminum knobs; and high-volume reservoirs with floating piston. The parts could also undergo corresponding heat and anti-friction treatments, processes that are important for the production of a high-performance shock absorber.

As may also be better appreciated, the present invention, by virtue of its design and components, as briefly described hereinabove, is a substantial inprovement over other related devices and/or methods known in the prior art, in that it enables: faster lap times; reduced rider fatigue; better control and traction; greater shock absorber versatility; and cooler running shocks for less fading.

Other substantial advantages that result from the present invention are that the track system 1, as briefly explained herein, and as exemplified in the accompanying drawings, enables: an adjustable range twin-stage compression damping; an adjustable high-speed and low-speed compression; an adjustable rebound; more travel and progression; a self-sagging device that lowers the centre of gravity; and a system 1 that can be modified or rebuilt and is very easy to service.

Of course, numerous modifications could be made to the above-described embodiments without departing from the scope of the present invention, as defined in the appended claims.

The invention claimed is:

1. A track system for providing complementary shock absorbing capability to a primary shock absorbing assembly having a hydraulic path containing fluid, the track system comprising:

a chamber having opposite first and second ends, the first end of the chamber being provided with a port operatively connectable to the hydraulic path of the primary shock absorbing assembly, said port being configured for allowing fluid from the hydraulic path of the primary shock absorbing assembly to enter and exit the chamber of the track system through the port thereof;

a damping assembly for damping a flow of fluid entering the chamber via the port thereof; and an adjusting assembly for adjusting a damping mode of the damping assembly;

wherein the track system is mountable and demountable, and wherein the chamber thereof, when assembled and operatively connected to the hydraulic path of the primary shock absorbing assembly, is sealed and closed-end, so that fluid entering and exiting the chamber is solely done via the port of said chamber;

wherein the damping assembly comprises:

a piston positioned within the chamber, adjacent to the port thereof, said piston being movable along the chamber and having a face for abutting against fluid from the hydraulic path of the primary shock absorbing assembly, when entering the chamber of the track system via the port thereof; and a biasing assembly for biasing the piston towards the port of the chamber, against the flow of fluid entering the chamber;

wherein the biasing assembly comprises a spring having opposite first and second extremities, the first extremity of the spring being operatively connected against the piston and the second extremity of the spring being operatively connected against the second end of the chamber for urging the piston towards the port of the chamber via a biasing force of the spring;

wherein the adjusting assembly comprises an adjustment screw, said adjustment screw having a portion operatively in abutment with the second extremity of the spring, the adjustment screw being movable longitudinally within the chamber for displacing the second extremity of the spring with respect to the first extremity of the spring for adjusting a biasing force of said spring; and wherein the adjustment screw has a portion being threadedly engaged with an inner component of the casing and is moveable therealong, the adjustment screw further having first and second extremities, the second extremity of the adjustment screw being provided with a knob positioned outwardly from the casing, the knob being configured such that a rotation thereof generates a displacement of the adjustment screw longitudinally within the chamber.

2. A track system according to claim 1, wherein the piston is provided with a peripheral seal cooperating with an inner wall of the chamber so as to prevent fluid from the hydraulic path of the primary shock absorbing assembly, when entering the chamber of the track system via the port thereof, from substantially flowing past the piston and corresponding seal.

3. A track system according to claim 1, wherein the knob is provided with a collar mountable rotatably about an outer portion of the chamber.

4. A track system according to claim 3, wherein an inner surface of the collar is provided with longitudinal grooves cooperating with at least one underlying detent mechanism for determining corresponding incremental changes in the rotation of the knob which result in corresponding incremental changes in the displacement of the adjustment screw and in turn result in incremental changes in the biasing force of the spring, by means of a variation in the effective length thereof, thereby enabling an incremental adjustment of the damping mode of the damping assembly via a rotation of the knob.

5. A track system according to claim 1, wherein the first extremity of the adjustment screw comprises a longitudinal stopper having an extremity configured to operatively abut against the piston for delimiting a range of compression of the spring within the chamber by the adjustment screw.

6. A track system according to claim 1, wherein the damping assembly comprises a valving assembly for providing via the track system a base complementary damping capability to the primary shock absorbing assembly, the valving assembly comprising a valving and at least one shim, the valving and the at least one shim being positioned within a first portion of the chamber between the port and the piston of the damping assembly for providing a base resistance to fluid from the hydraulic path of the primary shock absorbing assembly, when entering said first portion of the chamber of the track system, so as to provide the base complementary damping capability to the primary shock absorbing assembly.

7. A track system according to claim 6, wherein the valving and the at least one shim are secured to the first end of the chamber by means of a fastener having a head in abutment with an outermost shim of the at least one shim.

8. A track system according to claim 6, wherein the valving is provided with a peripheral seal cooperating with an inner wall of the chamber so that fluid from the hydraulic path of the primary shock absorbing assembly, when entering the first portion of the chamber via the port thereof, is passed through corresponding valving channels of the valving and about the at least one shim before abutting against the piston of the damping assembly.

9. A track system according to claim 1, wherein a spacer is provided in the chamber, between the piston of the dampimg assembly and the first extremity of the spring, so as to vary the effective length of the spring and thus adjust the biasing force of said spring.

10. A track system according to claim 9, wherein said spacer has opposite first and second end surfaces, the first end surface being operatively in abutment against the piston of the damping assembly and the second end surface being provided with a recess for receiving the first extremity of the spring.

11. A track system according to claim 1, wherein an additional spacer is provided in the chamber, between a portion of the adjustment screw and the second extremity of the spring, so as to vary the effective length of the spring and thus adjust the biasing force of said spring.

12. A track system according to claim 11, wherein said additonal spacer has opposite first and second end surfaces, the first end surface being provided with a recess for receiving the second extremity of the spring and the second end surface being operatively mounted about the first extremity of the adjustment screw.

13. A track system according to claim 11, wherein at least one bearing is operatively provided between the additional spacer and said portion of the adjustment screw so as to reduce friction thereinbetween.

14. A vehicle provided with at least one primary shock absorbing assembly having a hydraulic path containing fluid, each primary shock absorbing assembly being operatively connected to a corresponding track system for providing complementary shock absorbing capability to each given primary shock absorbing assembly, the track system comprising:

a chamber having opposite first and second ends, the first end of the chamber being provided with a port operatively connectable to the hydraulic path of the primary shock absorbing assembly, said port being configured for allowing fluid from the hydraulic path of the primary shock absorbing assembly to enter and exit the chamber of the track system through the port thereof;

a damping assembly for damping a flow of fluid entering the chamber via the port thereof; and an adjusting assembly for adjusting a damping mode of the damping assembly;

wherein the track system 1s mountable and demountable, and wherein the chamber thereof, when assembled and operatively connected to the hydraulic path of the primary shock absorbing assembly, is sealed and closed-end, so that fluid entering and exiting the chamber is solely done via the port of said chamber;

wherein the damping assembly comprises:

a piston positioned within the chamber, adjacent to the port thereof, said piston being movable along the chamber and having a face for abutting against fluid from the hydraulic path of the primary shock absorbing assembly, when entering the chamber of the track system via the port thereof; and a biasing assembly for biasing the piston towards the port of the chamber, against the flow of fluid entering the chamber;

wherein the biasing assembly comprises a spring having opposite first and second extremities, the first extremity of the spring being operatively connected against the piston and the second extremity of the spring being operatively connected against the second end of the chamber for urging the piston towards the port of the chamber via a biasing force of the spring;

wherein the adjusting assembly comprises an adjustment screw, said adjustment screw having a portion operatively in abutment with the second extremity of the spring, the adjustment screw being movable longitudinally within the chamber for displacing the second extremity of the spring with respect to the first extremity of the spring for adjusting a biasing force of said spring; and wherein the adjustment screw has a portion being threadedly engaged with an inner component of the casing and is moveable therealong, the adjustment screw further having first and second extremities, the second extremity of the adjustment screw being provided with a knob positioned outwardly from the casing, the knob being configured such that a rotation thereof generates a displacement of the adjustment screw longitudinally within the chamber.

* * * * *